March 24, 1970 L. E. AMBRICO 3,503,059
PULSE CROWDING COMPENSATION FOR MAGNETIC RECORDING
Filed March 22, 1967 4 Sheets-Sheet 1

INVENTOR
LOUIS E. AMBRICO
BY
[signature]
ATTORNEY

PULSE CROWDING COMPENSATION FOR MAGNETIC RECORDING

Filed March 22, 1967 4 Sheets-Sheet 4

United States Patent Office 3,503,059
Patented Mar. 24, 1970

3,503,059

PULSE CROWDING COMPENSATION FOR MAGNETIC RECORDING

Louis E. Ambrico, Hyde Park, N.Y., assignor to International Business Machines Corporation, Armonk, N.Y., a corporation of New York Filed Mar. 22, 1967, Ser. No. 625,088
Int. Cl. G11b *5/00*
U.S. Cl. 340—174.1 18 Claims

ABSTRACT OF THE DISCLOSURE

Controlled recording means and method for eliminating adverse effects of pulse crowding in magnetic recording systems. The controlled recording produces a recording waveform to a writing transducer adjacent the recording medium which waveform has major transitions from one level or state to the other to represent data in a selected code, and has minor transitions of opposite polarity or direction following each major transition to compensate for and effectively eliminate peak shift.

SUMMARY OF INVENTION

This invention relates to magnetic recording apparatus, and more particularly to means for improving the reliability with which information can be recorded and recovered in such apparatus at various densities, including very high densities.

Present day data processing systems make extensive use of magnetic storage apparatus such as magnetic tape, disc and drum systems, wherein information is stored in the form of magnetized areas on a movable magnetic medium and is recorded and recovered by transducers positioned adjacent the medium. Recent advances in the data processing arts have required the development of storage systems having significantly enhanced storage and retrieval speeds, so that information can be handled in such storage systems at rates commensurate with the capabilities of the data processing apparatus being served. Speed of information flow in tape, disc, etc., storage systems is a function of the density of the information stored on a given portion of the movable medium and the speed at which the medium can be moved past the transducing apparatus. Accordingly, an improvement in the density at which information can be recorded on the medium, and reliably retrieved, represents a substantial contribution to the art.

In addition to the need for a reliable high density recording technique, there is a need for a technique which will insure reliable recording and recovery of information on record media which may be recorded at one speed and read out at another. Present day magnetic storage systems include devices which, though otherwise compatible, move the recording media at various different speeds ranging from less than 20 inches per second to more than 100 inches per second.

It is well known in the magnetic recording art that certain undesirable effects accompany magnetic recording of information at high densities. These effects are created by the interaction of closely packed magnetic bits in the medium and are often referred to as pulse crowding effects. These effects are exhibited in the waveforms representing information recovered or read from the medium as shifts in the peaks of the waveforms from their proper time positions, and in variations of the baseline or reference level of the waveform. The effects are pattern sensitive; that is, they appear more severely in certain recorded information patterns than in others. They are a major limiting factor in the density at which information can be reliably stored and retrieved since, in "worst case" patterns, they can so distort the recovered waveforms of densely packed information as to render them unintelligible.

The pulse crowding effects just described are not only pattern sensitive, but they differ somewhat as a function of the speed of movement of the medium and recording rate, as well. Thus, for a given recording density, the crowding effects may vary, depending upon the speed of movement of the medium during recording. This introduces an additional adversity to reliable information recovery when a record medium is read at a speed different from that at which it was recorded.

Various techniques have been employed by the art to reduce the deleterious effects of pulse crowding. One such technique involves the provision of means for analyzing the preceding and succeeding information bits at the time each bit is written, and making a time adjustment of the recording dependent upon the information pattern to compensate for peak shifting. While this technique is effective, it requires a "look ahead" technique and delays recording of a given bit until the value of the next bit is known.

It is the object of this invention to provide a technique for recording information on a moving magnetic medium which compensates for the undesirable pulse crowding effects in a simple and reliable manner without necessitating the inclusion of complex logic circuitry.

The invention also contemplates the provision of such a recording system wherein the shifting of peaks in the recorded waveform is corrected uniformly regardless of recording speeds so that reliable signal recovery may be realized at speeds different from the recording speed.

The pulse crowding effect compensation is achieved, according to the present invention, by the provision of means and a method for insuring that the individual magnetic transitions on the medium are so written as to produce, upon readout, individual pulses that are narrow and symmetrical, and more precisely shaped than the pulses recovered from prior art recording systems. It has been discovered that a primary cause of peak shift in recording systems of the type here involved is the non-symmetrical shape of the recovered isolated pulse, and specifically the presence of an elongated trailing pulse edge. It appears that this trailing edge adds algebraically to the succeeding pulse and, in effect, "crowds" it out of its normal position. By improving the shape of the recovered isolated pulse and eliminating the elongated trailing edge, dramatic improvement in peak shift is realized.

The improvement in recovered pulse shape is attained, in accordance with this invention, by controlling the recording current so that a predetermined time after each major transition of the current (which produces a magnetic transition on the recording medium), there is a minor transition of the current in the opposite direction. This minor transition affects the magnetic condition of the recording medium in such a way that when the condition is read out a more precisely defined pulse, having a sharp trailing edge as well as a sharp leading edge, is produced. A pattern of information bits written with this technique does not include, upon recovery, the adverse crowding effects normally observed.

The recording technique provided by this invention is particularly useful in systems which employ so-called phase modulation or phase encoding techniques to record information. It is, however, also applicable to other forms of coding, including the non-return-to-zero technique, frequency modulation techniques, etc. It is most effective in recording systems that do not fully saturate the entire thickness of the magnetic coating.

The foregoing and other objects, features and advantages of the invention will be apparent from the following more particular description of preferred embodiments of the invention, as illustrated in the accompanying drawings.

DETAILED DESCRIPTION

Figure 1:
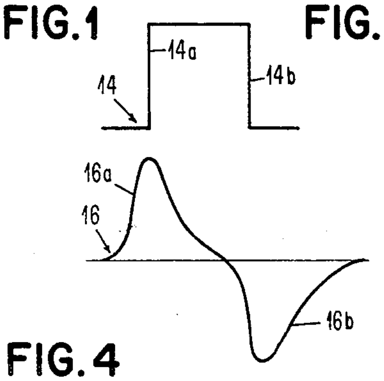
FIGURE 1 is an illustration of a normal recording signal and the corresponding isolated readout signal, showing the non-symmetrical pulse shape that is believed to contribute to pulse crowding effects.
Figure 2:
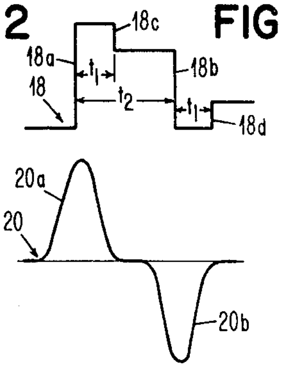
FIGURE 2 is an illustration similar to FIGURE 1, but showing the recording and readout waveforms obtained when the present invention is employed.
Figure 3:
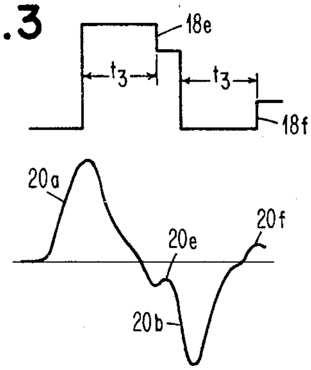
FIGURE 3 is an illustration similar to FIGURE 2, but showing the effect of an overly long delay between major and minor transitions in the recording waveform.

(a) Controlled recording concept—FIGURES 1, 2 and 3

Referring now in detail to the drawings, there are shown in FIGURE 1 writing (recording) and readout (playback) signals 14 and 16, representing the recording of an information pattern on a magnetic medium such as a conventional magnetic tape. The pattern is not necessarily representative of any coding scheme, but is provided to illustrate the concept of this invention. Those skilled in the art will understand that the writing waveform 14 is employed to energize a magnetic recording head of the well known type having a transducing gap through which flux lines flow to magnetize portions of the magnetic material passing therebeneath. The readout waveform 16 is that which is induced in the sensing coil of a conventional gap-type reading head when the magnetized portion of the medium passes therebeneath.

The writing waveform 14 is shown as including two transitions **14*a* and 14*b* from an initial state to the opposite state and then, after a time delay, back again. These transitions create a magnetization pattern on the medium which, when passed beneath the reading head, will induce a readout signal having a pulse 16*a* of one polarity corresponding to transition 14*a* and a pulse 16*b* of opposite polarity corresponding to transition 14*b***. These pulses actually represent the changes in polarity of the magnetic domains in the medium produced by the flux changes in the writing head in response to the write signal transitions, and they have, ideally, the same phase relationship with each other as the write signal transitions. For the sake of clarity, they are shown in phase with the write signal transitions which cause them.

These pulses **16*a* and 16*b*** are, ideally, symmetrical, gaussian pulses. It is found in actual practice with present day recording systems, however, that they do not exhibit the symmetrical shape they should have, but that the trailing edges thereof have a lesser average slope than the leading edges, as shown in FIGURE 1. The precise reason for this long trailing edge of the readout pulse is not fully understood. It may have to do with the way in which the magnetic material of the medium responds to magnetization. In any event, the condition is observed and in high density recording it appears to be a major cause of peak shift. It is thought the trailing edges of the readout pulses add algebraically to the succeeding pulses and produce the distortions in recovered waveform that are recognized as peak shift.

What has been found in accordance with this invention is that by controlling the writing waveform in the manner hereinafter described, it is possible to eliminate the long trailing edges of the read-out pulses and to make them significantly narrower, typically by a factor of two, and more symmetrical. It has further been found that the waveforms recovered when information patterns are recorded with the controlled writing provided by this invention do not display the severe peak shift otherwise present. Recording and playback is rendered much more reliable for any given density, and dramatic increases in recording density can be realized without loss of signal-recovery capability and without changing the thickness of the recording medium.

The controlled writing concept is shown in FIGURE 2. It consists, basically, in following each transition of the writing waveform with a lesser transition of opposite polarity after a short time interval. For example, in the writing waveform 18 of FIGURE 2, the transition **18*a*, which is provided to change the direction of magnetism of the medium, is followed a time $t_1$ later by a minor transition 18*c*. The next information recording transition 18*b*, which may occur after transition 18*a* at a time $t_2$ that is controlled by the coding scheme employed and the information pattern to be recorded, is likewise followed a time $t_1$ later by an opposite polarity minor transition 18*d*. It is observed that the readout waveform 20 produced by this controlled recording has narrower, more symmetrical pulses 20*a* and 20*b*, corresponding to the major transitions 18*a* and 18*b*, and that these pulses 20*a* and 20*b* bears a more precise phase relationship than the pulses 16*a* and 16*b*** of FIGURE 1.

The exact physical mechanism that causes the result shown in FIGURE 2 is not fully understood. It is believed, however, that the minor transitions **18*c* and 18*d* in the recording waveform tend to write minor bits on the medium which, upon readout, produce small pulses of opposite polarity to the major pulses 20*a* and 20*b*, displaced slightly in time, and that these pulses when superimposed on the pulse 18*a* and 18*b* cancel the long trailing edges thereof and impart the desired shape. This explanation is strengthened by the discovery that if the minor transitions are provided at some time $t_3$, significantly greater than $t_1$, after their corresponding major transitions, as shown at 18*e* and 18*f* in FIGURE 3, the resulting readout waveform is observed to have separately identifiable minor pulses 20*e* and 20*f* following the major pulses 20*a* and 20*b***. Moreover, the trailing edges of the major pulses again have the undesirable long trailing edge sought to be avoided. It has been experimentally determined that these minor pulses can be moved relative to the major pulses by adjusting the time delay between the major transitions in the recording waveform and their following minor transitions. As the time delay is decreased from $t_3$ to $t_1$, the minor pulses are seen to move toward and eventually blend with or superimpose upon the major pulses.

The exact time interval $t_1$ which produces the desired compensation of the asymmetrical readout pulses and the amplitude of the minor transitions with respect to the amplitude of the minor transitions with respect to the amplitude of the major transitions will depend upon the parameters of the recording system employed. Generally speaking, it has been found that the minor transitions should be from 15% to 35% of the total magnitude of the major transitions. The total magnitude is considered to be the difference between the current level at the end of a positive major transition and the current level at the end of a negative major transition. The timing cannot be so easily characterized, however, since it depends upon the speed of movement of the medium upon which the recording is performed, as well as upon the density of recording upon the medium. For a given recording system, the time may be determined by observing the effects of various delay times on the recovered waveform as described above. As a general guide, it may be stated that in a system which records 3000 signal transitions per inch it has been found that the minor transition should follow the major transition about one-third of the time period between major transitions.

Figure 4:
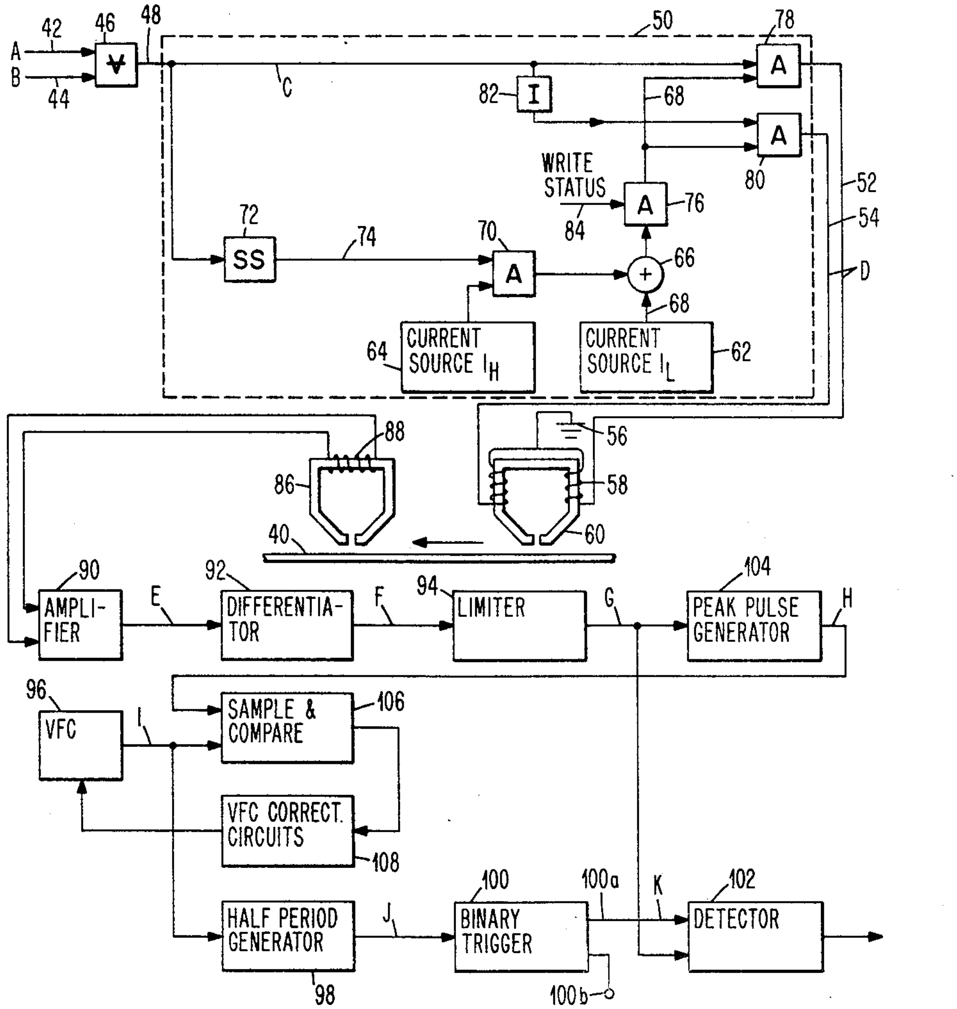
FIGURE 4 is a schematic illustration of a phase encoding recording system embodying the present invention.
Figure 5:
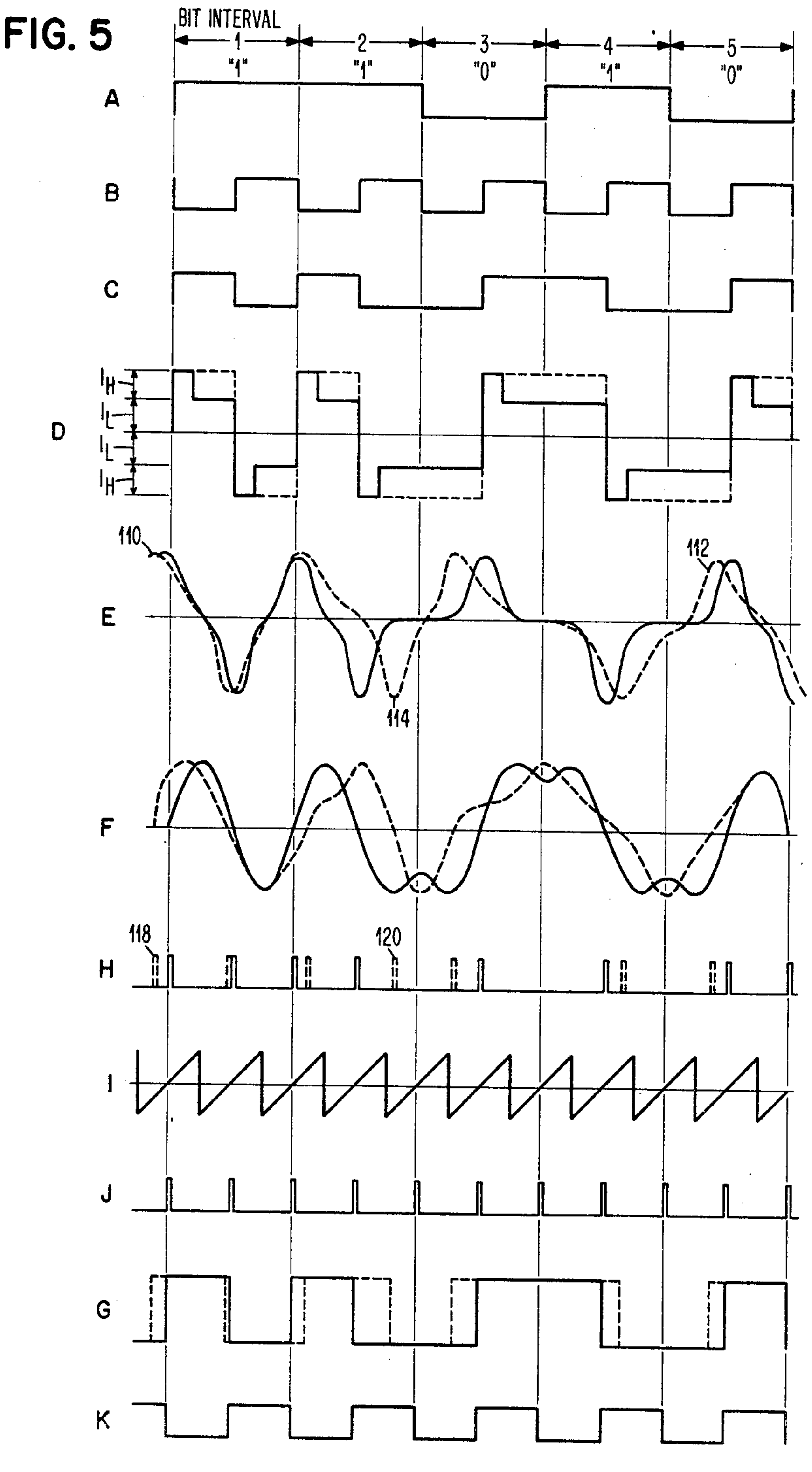
FIGURE 5 is a waveform diagram showing the waveforms obtained at various points in the system of FIGURE 4.
Figure 6:
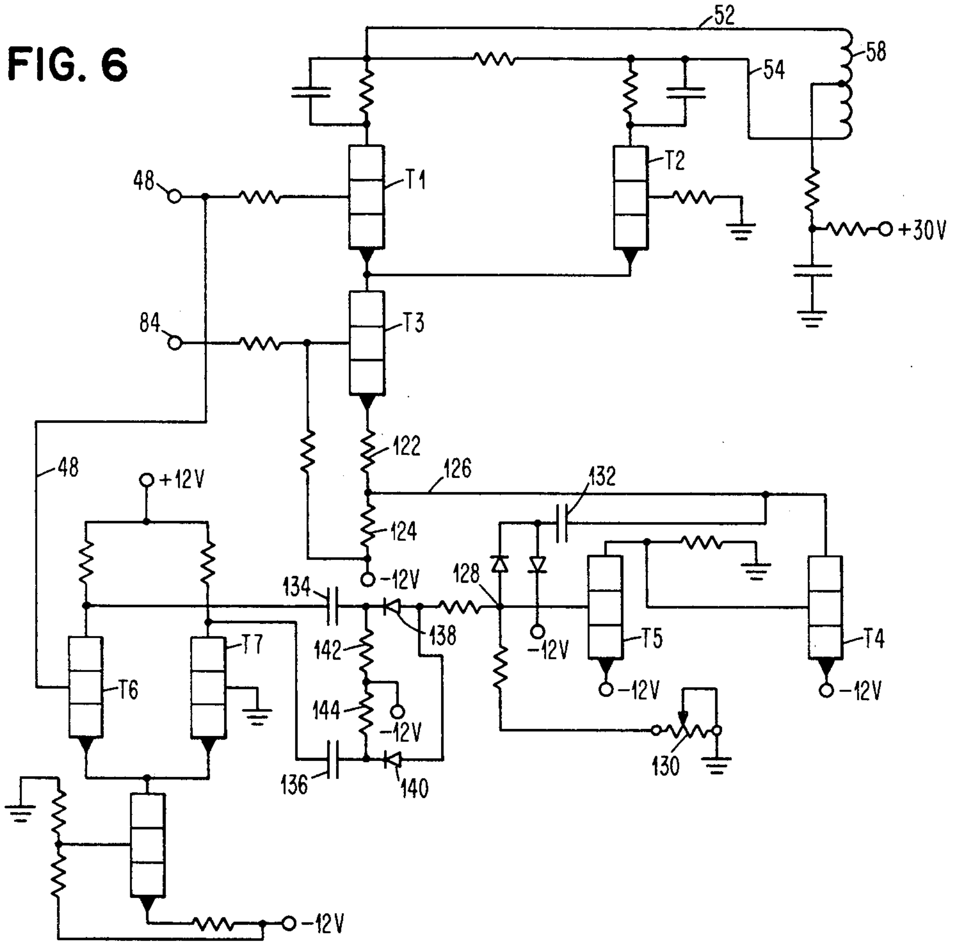
FIGURE 6 is a circuit diagram showing in detail the writing circuits of FIGURE 4.

The controlled writing technique disclosed herein is applicable to any magnetic recording scheme or system which employs write signal transitions to record information. Examples of such schemes or systems include non-return-to-zero recording, phase encoding, and frequency modulation. FIGURES 4–6, inclusive, illustrate the technique as applied to a recording system employing phase encoding, and FIGURES 7–9, inclusive, illustrate a non-return-to-zero system employing this invention.

(b) Phase encoded recording system—FIGURES 4, 5 and 6

FIGURE 4 shows, in block diagram form, a recording and readout system embodying this invention. This system employs a phase modulation encoding system to store information on a recording tape 40. As illustrated by the waveform C of FIGURE 5, this encoding system employs a signal transition during each bit interval to represent binary information. A negative going signal transition of the recording waveform represents a binary one during a data interval and a positive going transition records a binary zero. Transitions between bit intervals containing the same data values are used for timing purposes. A clock (not shown) defines data intervals by producing the square wave shown at B in FIGURE 5. Each cycle of the clock defines a bit interval.

The phase encoded waveform C of FIGURE 5 is produced by mixing raw binary data with the clock pulses. Binary data in the usual form of positive and negative signal levels, respectively representing ones and zeros, is supplied to the storage system by data processing apparatus (not shown). Waveform A represents typical data in this form, in this case having the value of 11010. To obtain the phase encoded waveform C of FIGURE 5, the data signal A and the clock signal B are supplied to the two input lines 42 and 44 of an EXCLUSIVE-OR circuit 46. This logic circuit, which is well known in the art, provides an output on line 48 that has a positive level when only one of its two inputs is positive and a negative level when neither or both inputs are positive. In effect, it inverts the clock pulses during bit intervals when a binary one is present and passes them without inversion when a zero is present, thus phase encoding the information.

The phase encoded waveform C on line 48 is supplied to write driver circuits generally indicated by the dotted rectangle 50. These circuits are connected via lines 52 and 54 to center tapped coil 58 of a write head 60 positioned in transducing relationship with the tape 40. The center tap 56 of the coil 58 is connected to reference potential as shown. A typical driver circuit is shown in FIGURE 6 and will be explained later herein. For the purposes of the present discussion, it is sufficient to consider the driver in terms of the functional blocks shown within the rectangle 50.

The write driver 50 is arranged to supply the waveform D (which has the major and minor transitions described hereinbefore) to the head 60. The driver 50 includes two individual drive current-supplying circuits, represented by the blocks 62 and 64. Each such current source is adapted to supply continuous positive current of a predetermined magnitude on its output line. Current source 62 supplies current $I_L$ and current source 64 supplies current $I_H$ (see waveform D). These current sources are connected through a current-summing device 66 which supplies the the summed current via line 68 to switching means that control the lines 52 and 54 for the write head coil 58.

It will be observed that the output of source 64 is fed to the summing device through AND gate 70, which is controlled by the output of an A.C. holdover single shot 72. This single shot is designed to be triggered by each signal transition, both positive and negative, of the phase encoded data waveform C and is, accordingly, connected to the output 48 of EXCLUSIVE-OR circuit 46. The circuit 72 (shown in detail in FIGURE 6) responds to each signal transition on line 48 by supplying a gating pulse of predetermined time duration to the gating input 74 of gate 70. In the embodiment being described, this interval is equal to one-sixth of a clock cycle.

Current summing network 66, then, supplies line 68 with current $I_L$ continuously, and supplies $I_L+I_H$ for one-third of a clock cycle after each transition of the coded data waveform C. The output line 68 connects through AND gate 76 (the purpose of which will be explained later) to two current switching gates 78 and 80 that connect respectively to lines 52 and 54 of coil 58. The function of the gates 78 and 80 is to supply the writing current on line 68 to one half the center tapped coil 58 during periods when the data waveform C has a positive state and to the other half when the waveform has a negative state, so as to magnetize the tape 40 in one direction and then the other in accordance with the coded input data. Gate 78 is primed directly from line 48 and thus opened while this line is positive and closed while it is negative. Gate 80 is primed from line 48 through inverter 82 and is, accordingly, opened whenever the line 48 is negative.

The composite waveform supplied to coil 58 by the apparatus just described is shown at D in FIGURE 5. It produces the controlled recording taught by this invention.

The gate 76 in line 58, previously mentioned, is controlled from a WRITE STATUS command line 84 that is energized whenever the recording system is activated to write tape, and data format information is present. The means for controlling line 84 forms no part of this invention and is, accordingly, not shown.

The detection apparatus shown in FIGURE 4 is not, per se, a part of this invention and it is shown only in block diagram form. It will be explained herein only to the depth necessary for a general understanding of its function. Reference will be made to the several waveforms E–K of FIGURE 5 which represent signals at various points in the detection system. It will be noted that waveforms E, F, G and H actually include both a solid line trace and a dashed line trace. The solid line trace in each case represents the waveform as it appears when the controlled recording provided by this invention is employed. The dashed line trace represents the result of uncompensated recording. These traces are superimposed in the several waveforms to graphically illustrate the problems presented in recovering data in the presence of peak shift and the improvement provided by the present invention.

The detection apparatus of FIGURE 4 includes a reading head 86 having a sense winding 88 in which voltages are induced by passage of magnetic transitions in tape 40 across the read head gap. The output of the sense winding is amplified by amplifier 90, the output of which is shown in waveform E. The signal is differentiated by the differentiating circuits 92 to obtain a signal F having zero crossovers corresponding to the peaks in the read signal E. The differentiated waveform is further amplified and limited by circuits generally indicated at 94 to provide a limited data waveform shown at G. This waveform, it will be noted, is substantially the same as phase encoded waveform C.

To demodulate the limited data signal G and recover binary ones and zeroes in the usual form (waveform A) it is necessary to compare the limited phase encoded data with clock information. Such clock information is provided by the variable frequency clock 96. This clock is arranged to provide pulses having twice the frequency as the incoming data. The clock output is a sawtooth wave as shown at I. The sawtooth wave I is supplied to a half-period generator 98 which is arranged to supply a short duration impulse each time the sawtooth wave passes through a zero reference level in the positive direction. Waveform J illustrates these impulses. They are used to switch a binary connected trigger 100 alternately from one state to the other and provide a square wave K having the same frequency as the bit interval of limited data waveform G. Two complementary outputs 100*a* and 100*b* are provided from the trigger 100; only one is used. In actual practice, means are provided for selecting a desired one of the two outputs since the trigger might reside at the beginning of a read operation in either state and could be 180° out of phase with the data at one output 100*a* or 100*b*. The means for phasing the trigger are not important to the invention, however, and are not shown.

Both the trigger output K and the limited data G are supplied to detecting circuits 102. These circuits compare the phase encoded data with the clock information and supply binary ones and zeroes in the form of signal levels such as waveform A to utilization apparatus, not shown. Because of the pulse crowding effects in the read waveform, described later herein with reference to FIGURE 5, and because of tape velocity variations, some phase difference may exist between the two waveforms. It is, therefore, necessary to examine the data waveform over an entire clock cycle to see whether it is more out of phase (representing a one) or in phase (representing a zero). This phase detection may be accomplished in any of several ways. For example, the detection circuits may sense the polarity of the transition in the data waveform occurring nearest the center of the clock period, or they may perform parallel integrations with the clock and data signals, one integration whenever the two are of the same polarity and another when they are of opposite polarities. By detecting which integration attained and the highest value during the bit interval, a data value can be identified.

As mentioned earlier, it is necessary in this detection system to keep the clock 96 in synchronism with the incoming data, and to maintain synchronism if the data rate varies due to velocity variations in tape motion, etc. Synchronism is achieved through a servo-like system which includes a generator 104 that produces short duration impulses whenever the limited data waveform experiences a transition from one state to the other. These impulses correspond to peaks in the read head signal E and are, accordingly, called peak pulses. They are shown in waveform H. They are supplied, along with the sawtooth output of the clock 96, to sample and compare circuits 106 which sample the sawtooth waveform whenever a peak pulse occurs and supply an output indicating the level of the sawtooth at that time. If the clock and data waveforms are at the same frequency, the sample will occur half way up the sawtooth wave, at the zero reference level. A positive level of the sawtooth at sample time will indicate that the clock is running too fast, and a negative level will indicate it is running slow. These sampled outputs from circuits 106 are supplied to correction circuits 108 whose function is to apply correction signals to the clock in response to error indications. The correction circuits may include memory apparatus to insure that the clock is modified on the basis of a trend in the error signals to avoid correction based upon noise or pulse crowding effects.

It will be appreciated from the foregoing that the detection apparatus relies upon a reasonable consistency in frequency of the recovered data waveform to assure correct detection of information values. Frequency variations which are a function of velocity variations in the tape drive system are of a reasonably low frequency and can be followed by the variable frequency clock. The variations caused by peak shift are erratic and cannot be closely followed, so they tend to make detection less reliable and also make clock synchronization more difficult. The problems created in the detection circuitry by peak shift, and the advantages enjoyed by the controlled recording provided by this invention, will be apparent from consideration of the solid and dashed waveforms of FIGURE 5.

Considering the uncompensated recording first, as represented by the waveform D without the minor transitions (dashed waveform), it is found that upon readout the peaks of the amplified read head signal E move significantly from their proper relative positions. Where a short wavelength follows a long wavelength, as at points 110 and 112, the peaks tend to move "upstream"; and where a long wavelength follows a short wavelength, as at 114, "downstream" movement is observed. These peak shifts, upon differentiation, displace the zero crossings significantly, and produce a limited data waveform F which has wide variations in frequency. Peak pulses (dashed waveform H) generated from the uncompensated limited data do not occur at proper times with respect to the sawtooth wave I even when no velocity variations exist. They tend to create erratic clock error indications which seek to alternately speed up and slow down the clock without regard to true differences between the clock rate and average data rate. For example, the peak pulse identified at 118, which corresponds to peak 110 in the head signal E, samples the sawtooth wave I early and indicates that the clock is significantly slow. The peak pulse 120, which corresponds to peak 114, however, samples late and should indicate that the clock is running much too fast. If the clock is adjusted to respond rapidly to those correction inputs, a danger of loss of synchronism exists since, in speeding up in response to one input, e.g. 118, the clock may attain a frequency which causes a subsequent peak pulse, e.g. 120, to sample not the ramp it should, but the next one, giving another "too slow" correction and driving the clock completely out of synchronization. The clock, therefore, must have some "stiffness" in its response to maintain synchronism at all, and this limits the rate of velocity variation it can follow.

In addition to the adverse affects it has on the clock, peak shift also seriously limits the accuracy of data detection. For example, consider the second and third data intervals shown in FIGURE 5. Comparison of the dashed waveform G with the clock trigger waveform K shows that during the second interval the two waveforms have opposite levels for about two-thirds of the interval, but have the same level during the remaining third. Unless the detection circuits are very sensitive, it will be difficult to read the data as a binary one. Similarly, with the third interval, the levels are the same for only about two-thirds of the interval and different during the remaining third. Again, detection of the zero is difficult; particularly if the data rate is high and the time intervals correspondingly short.

An examination of the solid line waveforms in FIGURE 5 will show that with the controlled recording provided by this invention, peak shift is reduced dramatically and both clock synchronization and reliable data detection are readily achieved. While minor variations may exist, the clock trigger waveform K and the limited data waveform G have effectively the same frequency. Binary ones and zeros are firmly indicated by signal level comparisons that persist throughout the entire data intervals.

FIGURE 6 of the drawings illustrates a specific circuit for providing the controlled recording of phase encoded data as described in connection with the embodiment of FIGURE 4. In this circuit, transistors T1 and T2 operate in a current switching mode in response to signals on line 48. When line 48 is at a high level, T1 is turned on and T2 is off, thus supplying current through line 52 to the upper half of drive coil 58. When line 48 is at a low level, T1 is turned off, allowing T2 to go into conduction to supply current through lead 54 to the other half of coil 58. T1 and T2 thus perform the functions of the gates 78 and 80 of FIGURE 4. Transistor T3 operates as a current sink for T1 and T2. It is activated by a signal (WRITE STATUS) on line 84. It thus performs the function of gate 76 of FIGURE 4. The emitter resistors 122 and 124 of T3 determine the current flow in T3. These resistors thus may be equated to the current sources 62 and 64, respectively. When both are in circuit with T3, a current $I_L$ is permitted. However, if resistor 124 is shorted out, current $I_L$ and $I_H$ is produced.

The means for shorting resistor 124 includes line 126 which connects to the collector of transistor T4. This device is a part of a holdover single shot (element 72 of FIGURE 4) including transistor T5. The single shot is normally in a quiescent state wherein T5 is conducting and, consequently, holding T4 cut off by maintaining its base at −12 v. Upon receipt of a negative spike at circuit point 128, T5 cuts off for a time determined by the network including variable resistor 130 and capacitor 132. While T5 is cut off T4 is allowed to conduct and via line 126 connect the circuit point intermediate resistors 122 and 124 to −12 v. This effectively shorts resistor 124 out of the circuit and increases the current level through T3 to the head coil 58. The duration of the high level current is controlled by the timing of the single shot.

The single shot is activated through a current switching circuit including transistors T6 and T7, that provides the negative spike at point 128 in response to a transition of line 48 from either state to the other. As can be seen, each transition, whether positive or negative, toggles the current switch one way or the other, turning one of T6 or T7 on and the other off. When either transistor goes off, a negative signal is passed via its collector capacitor 134 or 136 to the rectifying circuit including diodes 138 and 140, and resistors 142 and 144. Regardless of which transistor provided the negative pulse, the rectifying circuit supplies it at point 128.

This circuit thus operates in the manner described with reference to FIGURE 4, to supply solid line waveform D of FIGURE 5 in response to application of phase encoded data (waveform C) on line 48. The time during which the high level current is supplied after each data transition is controlled by the single shot timing, and the respective values of $I_L$ and $I_H$ are controlled by the values of resistors 122 and 124.

Figure 7:
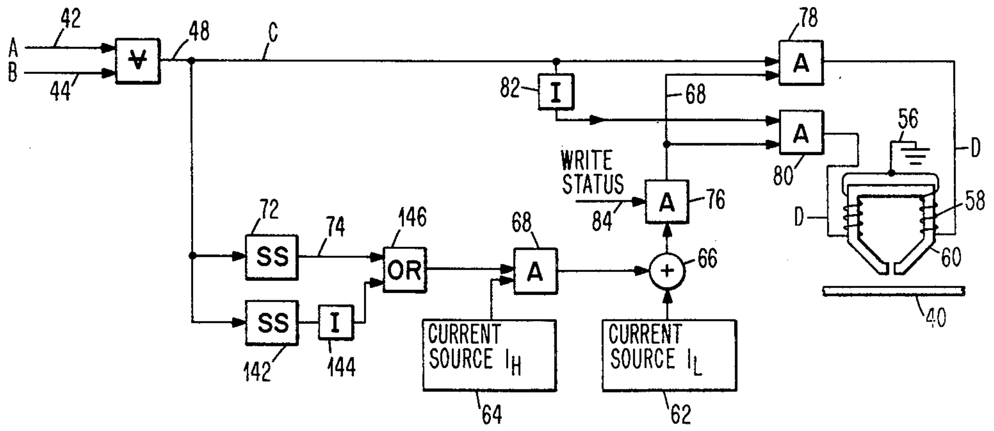
FIGURE 7 is a schematic diagram illustrating a modified embodiment of the writing diagram of FIGURE 4.

(c) Phase encoding recording system, modified embodiment—FIGURE 7

In recording systems of the type here described, it is sometimes desirable to employ the write head 60 for the purpose of erasing information on the tape 40. This might be the case in a system which does not have a separate erase head, or where the erase head is physically spaced a substantial distance from the recording and reading heads. In this latter case, situations may arise where the tape is back-spaced over an old record and a new record is to be rewritten, the new record being short compared to the old. If the erase head is positioned a distance downstream from the write head greater than the length of the new record, old material could be left on the tape unless the write head is adapted to erase it. In a system that does not employ controlled recording, this is handled quite simply by turning on the write current whenever erasing is required. In the system shown in FIGURE 4, however, a problem could arise because of the fact that when the write current is supplied, it assumes the level $I_L$ as soon as the single shot 72 times out, and this level is not sufficient to insure complete erasure. This difficulty is avoided by the write head controlling circuit shown in FIGURE 7.

The writing circuit of FIGURE 7 is identical to that of FIGURE 4, except for the addition of a second A.C. triggered holdover single shot 142 activated by line 48 in parallel with single shot 72. The output of this additional single shot 142 is inverted by inverter 144 and connected via OR circuit 146 to the input gate 68 with the output 74 of single shot 72.

Single shot 142 is arranged to have a delay time or pulse duration time of slightly more than one bit interval, say one and one-half bit intervals. During normal writing operations, it has no effect upon the writing circuitry since it is triggered at least once during each bit interval by transitions in the phase encoded waveform and is thus constantly supplying an output to inverter 144, preventing any signal from appearing at the output of the inverter. However, after the last bit of a record is written, and no further transitions appear on line 48 (it being assumed that means are provided to deactivate clock line 44 in this case to prevent clock pulses from activating line 48), single shot 142 is allowed to time out. When it does, inverter 144 commences to supply a signal via OR circuit 146 to gate 68 to pass current from $I_H$ source 64 to summing network 66. Both $I_H$ and $I_L$ are thus applied to the head 60 for so long as WRITE STATUS line 84 remains up to perform effective erasure.

Examination of FIGURE 7 will show that this erasing current $I_H+I_L$ is supplied to the head at all times when the system is in WRITE STATUS and no data is present on line 48. Thus, the tape 40 is erased during operations such as WRITE DELAY and WRITE SKIP DELAY, both of which are common in commercial tape storage systems.

Figure 8:
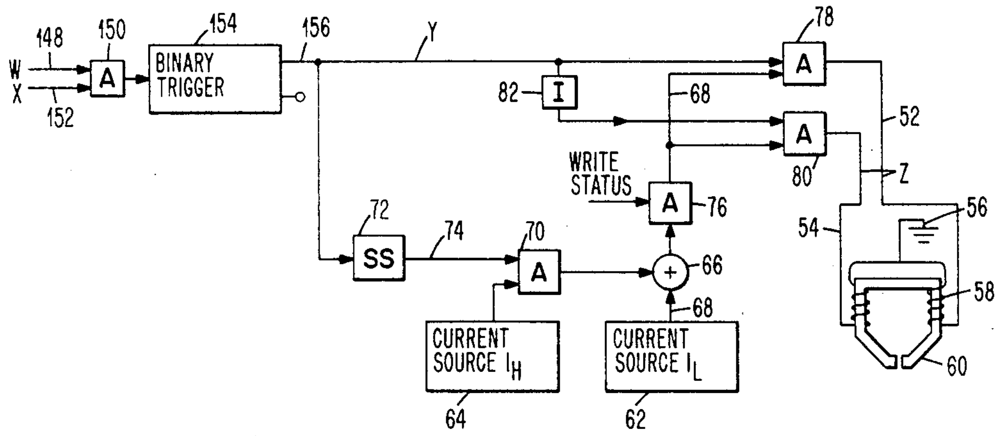
FIGURE 8 is a schematic diagram of writing circuits for recording NRZI data on a recording medium.
Figure 9:
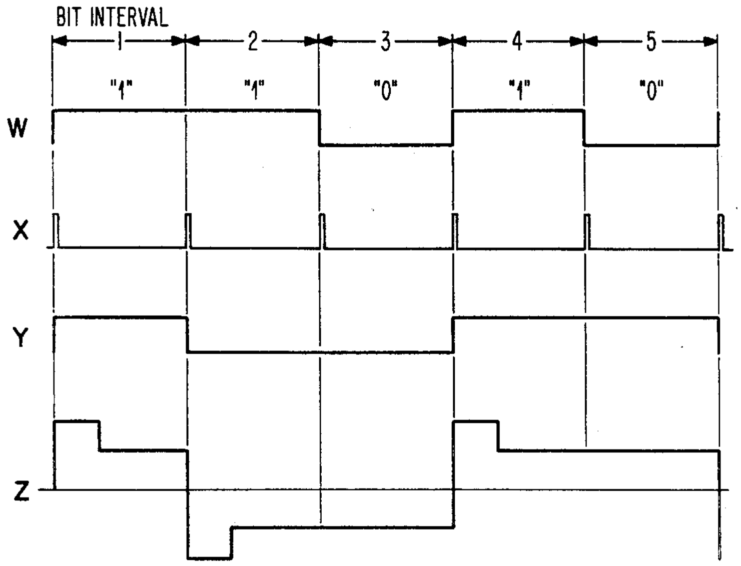
FIGURE 9 is a waveform diagram showing the waveforms obtained at various points in the system of FIGURE 8.

(d) NRZI recording system—FIGURES 8 and 9

It has been stated that the controlled recording provided in accordance with the invention is useful with various coding systems other than the phase encoding system described earlier herein. FIGURES 8 and 9 show the invention applied to a writing system which employs NRZI recording. Referring first to FIGURE 9, waveform Y shows an NRZI waveform in which a signal transition occurs during each bit interval in which a binary one is recorded and no transition occurs during intervals containing zeros. This encoded waveform is achieved by sampling raw binary data in the usual form of relatively positive and negative signal levels, as shown in waveform W of FIGURE 9, into a binary connected trigger. The sampling pulses are shown in waveform X. The sampling arrangement is such that if, at a sampling interval, a binary one is present, the trigger is flipped; but if a zero is present, it is not. The trigger thus produces, at one of its outputs, a waveform having a transition (either positive or negative) for each recorded binary one and no transition for recorded zeros.

A writing circuit including such a trigger is shown in FIGURE 8. Line 148 supplies the raw binary data W to a gate 150 where it is sampled by the pulses X on line 152. The samples from gate 150 are supplied to the complementing input of binary trigger 154. NRZI waveform Y appears on output line 156 of the trigger. This data is employed to energize a write head 60 in precisely the same manner as described with reference to the writing circuits of FIGURE 4. Accordingly, the remaining circuit elements of FIGURE 8 bear the same reference characters as their counterpart in FIGURE 4. In this case, as in the case of phase encoded recording, it is desired that each major signal transition of the actual recording waveform Z be followed a predetermined time later by a minor transition of opposite polarity. It matters not whether the transitions represent NRZI encoded data or phase encoded data. Thus, the NRZI data on line 156 is supplied to the current switching devices 78 and 80 so that positive portions of waveform Y supply current to connection 52 and negative portions supply current to coil connection 54. Line 156 also connects to single shot 72 so that each transition of waveform Y, whether positive or negative, causes gate 76 to supply current $I_H+I_L$ for a short time and then $I_L$ continuously. Waveform Z is the result.

The benefits of controlled recording of NRZI data are the same as those of controlled recording of phase encoded data. While the detection system for NRZI recording is not shown, it will be appreciated that the adverse effects of pulse crowding (i.e., peak shift, etc.) impose limitations on reliable information recovery and elimination of these effects by the controlled recording system disclosed herein are equally beneficial to this encoding technique.

It has been stated earlier herein that the minor, compensating transitions are preferably 15% to 35% of the major transitions, and should follow at a time which does not permit the recording of a separately identifiable pulse (as shown in FIGURE 3). It should be understood that there is an interrelation between the minor transition magnitude and the time delay between it and its preceding major transition. What is desired is a compensation of the elongated trailing edge of the isolated recovered pulse, and this can be effected to various degrees by altering both the magnitude and timing of the minor transition. The higher the amplitude of the minor transition the closer it must follow its preceding major transition to avoid the appearance of a supplementary pulse.

With the recording system described in FIGURES 4–6, where 3000 transitions per inch are recorded, the minor transition follows one-sixth of a clock cycle behind its corresponding major transition and is about 25% of the full major transition (i.e., $I_H$ and $I_L$ are about equal). With this timing, the best results are attained when the minor transition is about 20% to 30% of the major transition. For magnitude outside this range (but within the generally effective 15% to 35% range) some time adjustment may be necessary.

While the invention has been particularly shown and described with reference to preferred embodiments thereof, it will be understood by those skilled in the art that various changes in form and details may be made therein without departing from the spirit and scope of the invention.

What is claimed is:

1. A magnetic recording system which records information in the form of magnetic patterns in a magnetizable medium, comprising a data signal source for supplying a data signal having a signal transitions therein representing information values in accordance with a predetermined code, a transducer, and means for supplying recording current to said transducer, said recording current-supplying means including means for providing major transitions in said recording current corresponding to said transitions in the data signal from said data signal source, wherein the improvement comprises:

controlled recording means responsive to a transition in the data signal from the signal source for producing in said recording current after a predetermined time interval following the major transition, a minor transition of magnitude less than the major transition, and of opposite sense to the major transition, said predetermined time interval being insufficient to cause the recording of a magnetic change in the medium that will produce a separately identifiable pulse when the medium is read out by a reading transducer, whereby to produce a magnetization pattern in said recording medium which when read out by a transducer will produce a read signal having reduced peak shift.

2. The invention defined in claim 1 wherein the means for providing the major transition in the recording current comprises means for changing the direction of current in the transducer in response to transitions in said data signal, and wherein the controlled recording means includes means for applying current of one level for a predetermined time interval following a change in current direction and for reducing said current level to a second level lower than the first level after said predetermined time interval.

3. The invention defined in claim 2 wherein the second current level is between about 30% and 70% of the first current level.

4. An improved magnetic recording system for writing information in a moving magnetizable medium comprising a magnetic transduced including an energizing winding for writing in the medium, a data signal source for providing a data signal having signal transitions therein representing information values in a predetermined code, and means for supplying recording current to said transducer energizing winding in response to said data signal, wherein the improvement comprises:

(a) a first recording current source for supplying recording current of a first magnitude;

(b) switching means for supplying current from said first source to said transducer winding, said switching means being operable in response to transitions in said data signal to change the direction of said recording current in said transducer winding, whereby each transition in the data signal causes recording current to flow through said transducer winding in a direction opposite the direction of flow immediately preceding the occurrence of said transition;

(c) a second recording current source operable upon activation to supply additional recording current of a second magnitude;

(d) means for supplying the recording current from the second source to the switching means in additive relation to the recording current from the first source; and (e) means responsive to a transition in said data signal for activating said second current source for a predetermined time interval.

5. The invention defined in claim 4 wherein the predetermined time interval during which the second current source is activated is too short to permit the recording of a separately identifiable magnetic manifestation on said magnetizable medium.

6. The invention defined in claim 4 wherein the means for activating said second current source includes a pulse generator for producing a pulse having a duration equal to said predetermined time interval, and means responsive to a transition in said data signal for causing said generator to produce a single pulse.

7. The invention defined in claim 4 wherein said first and second current sources comprise a current supply transistor having first and second current controlling resistors connected in circuit therewith, the second resistor having shorting switch means connected thereto, and wherein the pulse from said pulse generator activates said shorting switch means.

8. The invention defined in claim 4 wherein the magnitude of the current from said first recording current source is between 30% and 70% of the magnitude of the sum of the currents from the first and second recording current sources.

9. The invention defined in claim 8 wherein the duration of the pulse from said pulse generator is too short to permit the recording of a separately identifiable magnetic manifestation on the magnetizable medium when the second recording current is terminated, whereby the termination of said second current modifies the magnetic manifestation written by the sum of the first and second recording currents.

10. An improved method of recording information on a magnetic medium that passes adjacent a recording transducer at a predetermined speed, said method including the steps of supplying a recording signal to said transducer and causing information representing transitions in said signal from one signal state to another signal state at selected intervals, wherein said improvement comprises the steps of causing within a predetermined time interval after each information representing signal transition, a minor signal transition of opposite polarity to the immediately preceding information representing transition but of substantially lesser magnitude than said preceding transition, said predetermined time interval being insufficient to cause the recording of a separately identifiable pulse when the medium is read out by a reading transducer.

11. The invention defined in claim 10 wherein the information representing signal transitions are between two limiting signal states and wherein the minor transition following each information representing transition is to a signal state which resides between the limiting states.

12. A magnetic recording system which records information in the form of magnetic patterns in a magnetizable medium, comprising a data signal source for supplying a data signal having signal transitions therein representing information values in accordance with a predetermined code, a transducer, and means for supplying recording current to said transducer, said recording current supplying means including means for providing major transitions in said recording current corresponding to said transitions in the data signal from said data signal source, wherein the improvement comprises:

controlled recording means responsive to a transition in the data signal from the signal source for producing in said recording current after a predetermined time interval following the major transition, a minor transition of magnitude less than half the total magnitude of the major transition, and of opposite sense to the major transition, whereby to produce a magnetization pattern in said recording medium which when read out by a transducer will produce a read signal having reduced peak shift.

13. The invention defined in claim 12 wherein the magnitude of the said minor transition is between 15% and 35% of the total magnitude of the major transition.

14. The invention defined in claim 12 wherein the predetermined time interval is insufficient to cause the recording of a magnetic change in the medium that will produce a separately identifiable pulse when the medium is read out by a reading transducer.

15. A magnetic recording system which records information in the form of magnetic patterns in a magnetizable medium comprising a data signal source for supplying a data signal having signal transitions therein, a transducer, and means for supplying recording current to said transducer, said recording current supplying means including means for changing the recording current between two levels in response to signal transitions in said data signal, the current being maintained at the level to which it is changed in response to a signal transition until occurrence of the next signal transition, wherein the improvement comprises:

controlled recording means responsive to at least some signal transitions in the data signal for temporarily changing the recording current from the preceding one of the two levels at which it was maintained before the signal transition by an amount greater than the difference between the two levels and then returning it to the other of the two levels within a predetermined time.

16. The invention defined in claim 15 wherein the predetermined time during which the current is returned following a level change is short enough that such return will not produce a separately identifiable magnetic indication when the medium is read out by a reading transducer.

17. An improved method of recording information on a magnetic medium that passes adjacent a recording transducer at a predetermined speed, said method including the steps of:

(a) supplying a recording current to said transducer, said recording current being changed from one of two distinct current levels to the other of said two levels at selected intervals to represent information, said recording current being maintained at the level to which it is changed between intervals; and (b) upon occurrence of each change of the recording current, temporarily adjusting the current in the direction of the level to which it is being changed by an amount greater than the amount which separates the two levels and then returning the current to the new level within a predetermined time.

18. The method defined in claim 17 in which the predetermined time during which the current is returned following a level change is short enough with respect to the predetermined speed of the magnetic medium that such return will not produce a separately identifiable magnetic indication when the medium is read out by a reading transducer.

References Cited

UNITED STATES PATENTS 3,108,265 10/1963 Moe ---------------- 346—74

OTHER REFERENCES

Gabor, Andrew, "High Speed Computer Bulk Storage," Automatic Control, vol. 17, No. 2, September 1962, pp. 36–41.

STANLEY M. URYNOWICZ, Jr., Primary Examiner

WILLIAM F. WHITE, Assistant Examiner

U.S. Cl. X.R.

346—74

Disclaimer

3,503,059.—*Louis E. Ambrico*, Hyde Park, N.Y. PULSE CROWDING COMPENSATION FOR MAGNETIC RECORDING. Patent dated Mar. 24, 1970. Disclaimer filed Dec. 29, 1972, by the assignee, *International Business Machines Corporation.*

Hereby enters this disclaimer to claims 15, 16, 17 and 18 of said patent.

[*Official Gazette November 6, 1973.*]